US005552455A

United States Patent [19]

Schuler et al.

[11] Patent Number: 5,552,455

[45] Date of Patent: Sep. 3, 1996

[54] RADAR ABSORBING MATERIAL AND PROCESS FOR MAKING SAME

[75] Inventors: Ann M. Schuler, Marina Del Rey; Burl C. Fisher, Jr., Northridge, both of Calif.; Denys D. Overholser, Carson City, Nev.

[73] Assignee: Lockheed Corporation, Calabasas, Calif.

[21] Appl. No.: 521,165

[22] Filed: Aug. 31, 1995

[51] Int. Cl.[6] .................... G21F 1/10; C08K 3/10

[52] U.S. Cl. .................... 523/137; 523/136; 523/220; 524/431; 524/440

[58] Field of Search .................... 523/137, 220, 523/136; 524/431, 440

[56] References Cited

U.S. PATENT DOCUMENTS

| | | | |
|---|---|---|---|
| 3,568,195 | 3/1971 | Wesch, et al. | 343/18 |
| 4,003,840 | 1/1977 | Ishino et al. | 252/62 |
| 4,024,318 | 5/1977 | Forster | 428/519 |
| 4,116,906 | 9/1978 | Ishino et al. | 523/137 |
| 4,414,339 | 11/1983 | Solc et al. | 524/431 |
| 4,581,284 | 4/1986 | Eggert et al. | 428/283 |
| 5,085,931 | 2/1992 | Boyer, III et al. | 428/328 |
| 5,147,718 | 9/1992 | Papoulias et al. | 428/328 |
| 5,164,242 | 11/1992 | Webster et al. | 428/188 |
| 5,169,713 | 12/1992 | Kumurdjian | 428/323 |
| 5,338,617 | 8/1994 | Workinger, et al. | 428/551 |

OTHER PUBLICATIONS

A. S. Antonov, et al., Electrophysical Properties of Percolation Systems, 1990, The Institute of High Temperatures Russian Academy of Sciences, Moscow.

*Primary Examiner*—Tae Yoon
*Attorney, Agent, or Firm*—Louis L. Dachs

[57] ABSTRACT

The invention is a radar absorbing material and a process for making same. In detail, the invention includes a binder material containing a mixture of two groups of spheres made of a magnetic material, The first group of spheres have an average diameter and the second group have an average diameter generally 0.73 times the average diameter of the spheres of the first group. The first and second group contain generally equal numbers of spheres. The amount of the binder material incorporated is sufficient to both bind mixture together while maintaining the individual spheres separated from each other. The process involves the steps of: providing a first group of spheres made of a magnetic material; providing a second group of spheres made of a magnetic material containing a number of spheres equal to the number of spheres of the first group with an average diameter of generally 0.73 times the average diameter of the first group of spheres; mixing the first and second groups of spheres together; and adding an amount of the binder material sufficient to both bind the mixture together while maintaining the individual spheres separated from each other.

10 Claims, 9 Drawing Sheets

| CHANNEL DIAMETER (LOWER) μm | DIFF. VOLUME % | |
|---|---|---|
| | % LARGE DIAMETER | % SMALL DIAMETER |
| 0.657 | 0 | 0 |
| 0.721 | 0 | 0.962 |
| 0.791 | 0 | 8.96 |
| 0.869 | 0 | 6.83 |
| 0.953 | 0 | 4.45 |
| 1.047 | 0.030 | 3.10 |
| 1.149 | 0.338 | 2.21 |
| 1.261 | 0.764 | 0.128 |
| 1.385 | 0.801 | 0 |
| 1.520 | 0.659 | 0.175 |
| 1.669 | 0.630 | 1.86 |
| 1.832 | 0.947 | 1.78 |
| 2.010 | 1.80 | 5.89 |
| 2.207 | 3.27 | 7.90 |
| 2.423 | 5.22 | 7.75 |
| 2.660 | 7.37 | 6.67 |
| 2.920 | 9.41 | 5.12 |
| 3.206 | 10.99 | 3.49 |
| 3.519 | 11.84 | 2.08 |
| 3.862 | 11.81 | 1.06 |
| 4.241 | 10.89 | 0.427 |
| 4.656 | 9.19 | 0.127 |
| 5.111 | 6.95 | 0.021 |
| 5.611 | 4.49 | 0.001 |
| 6.158 | 2.08 | 0 |
| 6.761 | 0.491 | 0 |
| 7.421 | 0.030 | 0 |
| 8.147 | 0 | 0 |

FIG. 3
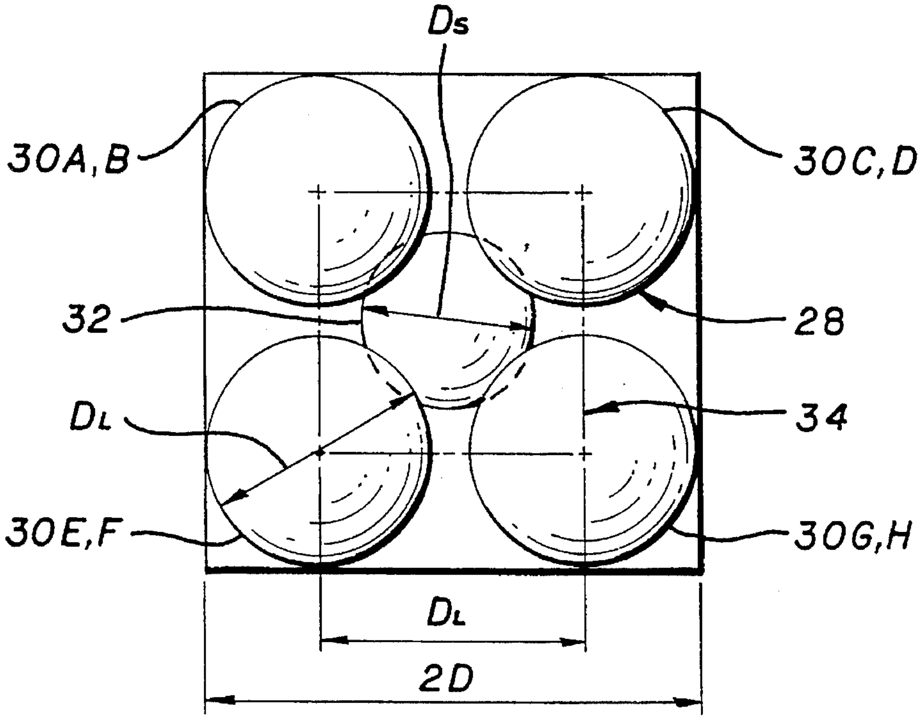
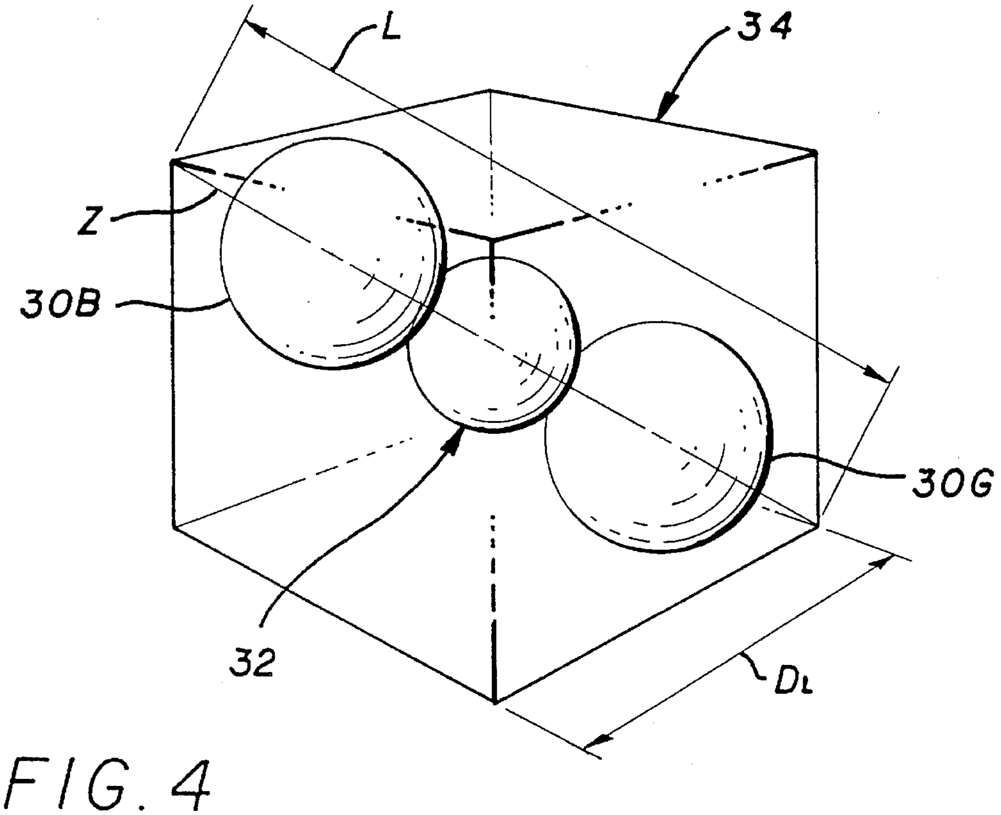
FIG. 4

SMALL DIAMETER PARTICLE NUMBER DISTRIBUTION

RADAR ABSORBING MATERIAL AND PROCESS FOR MAKING SAME

BACKGROUND OF THE INVENTION

1. Field of the Invention

The invention relates to the field of radar absorbing coatings and, in particular, to an improved coating incorporating iron particles.

2. Description of Related Art

Typical radar absorbing material (RAM) coatings incorporate iron particles in a resin that is either spray painted on the surface of the vehicle or applied thereon in the form of decals. The iron particles can also be incorporated into a ceramic matrix material. For example, U.S. Pat. Nos. 5,164,242 "Electromagnetic Wave Attenuating And Deicing Structure" by S. D. Webster, et. al, and 5,338,617 "Radio Frequency Absorbing Shield And Method" by D. M. Workinger, et. al. discloses the use of Carbonyl iron in a resin matrix, while U.S. Pat. No. 5,085,931 "Microwave Absorber Employing Acicular Magnetic Metallic Filaments" by C. E. Boyer, et al. discloses the use of filaments having an average length of 10 microns and diameters of about 0.1 micron. for use in an absorber. U.S. Pat. No. 4,003,840 "Microwave Absorber" by K. Iishino, et. al. suggests 1.65 mm ferrite powder in an organic high molecular compound; for example 0.2 to 0.9 part by volume ferrite powder and 0.8 to 0.1 organic high molecular compound. U.S. Pat. No. 3,568,195 "Electromagnetic Wave Attenuating Device" by L. Wesch, et. al. discloses an absorber comprising an outer radar wave attenuating layer that can incorporate iron powders and a non-metallic backing sheet.

In a good light weight specular RAM coating high attenuation level and broad frequency range are important. However, with such coatings peak attenuation band width decreases with decreasing frequency and causes attenuation at frequencies other than the peak attenuation frequencies to be less than 5 dB.

One common technique to improve the broad band response of a specular RAM is to use multiple coatings separated by some kind of a band pass filter. For example in U.S. Pat. Nos. 5,169,713 "High Frequency Electromagnetic Radiation Absorbent Coating Comprising A Binder And Chips From A Laminate Of Alternating Amorphous Magnetic Films And Electrically Insulating" by P. Kmurdjian. Kmurdjian discloses the use of multiple layers having a thickness in the 2–5 nanometer range, with each layer including an amorphous magnetic film and an insulating film of 1–5 electrically insulating material. In U.S. Pat. No. 4,581,284 "Fiber Compound Material" by D. Ggumbh a structure is disclosed made of fiber plies impregnated with a radar absorbing compounds in a concentration varying from the exterior to the interior side. U.S. Pat. No. 5,147,718 "Radar Absorber" by S. A Papoulias, et. al. discloses the use of a multi-layer absorber having a first layer with 4 to 5 micron carbonyl iron powder and a second layer with 0.5 to 1.5 micron powder. The inventor claims that such an absorber provides a relatively high radar attenuation magnitude over a selected broad band frequency range. U.S. Pat. No. 4,024,318 "Metal-Filled Plastic Material" by E. O. Forster, et. al. discloses the use of a multi-layer material wherein the first layer is filed with metal particles in a resin matrix and a second contains metal oxides in a resin matrix. However, such multiple layer absorbers have weak shear planes between layers, are expensive and, additionally, create field maintenance problems. A problem of both single and multiple coating is their high unit weight.

The performance of these coatings, particularly those using spherical particles, is dependent upon how closely the spheres are packed together. Thus the most efficient coating would be one approaching the density of solid iron with a minimum amount of resin included to electrically insulate the particles from one another. That is, the attenuation efficiency increases faster than the weight, so that a thinner coating with the same attenuation, can be used, providing an overall weight savings. Unfortunately, the particles, when produced, are of non-uniform diameter and not necessarily uniformly round. Even with filtering for size or centrifugal particle separation methods, a Gaussian distribution about the selected diameter occurs. Thus the best packing densities are around 4.5 grams per cubic centimeter for 5 micron diameter particles, when 5.7 grams per cubic centimeter could be obtained if all the particles were of exactly one diameter.

Thus it is a primary object of the subject invention to provide an improved radar absorbing material.

It is another primary object of the subject invention to provide an improved radar absorbing material that is lighter in weight than conventional absorbers having equal performance.

It is a further object of the subject invention to provide an improved single layer radar absorbing material that is lighter in weight than conventional absorbers having equal performance.

It is a still further object of the subject invention to provide an improved radar absorbing material that has a greater packing density when the spheres of magnetic material are distributed about a mean diameter.

SUMMARY OF THE INVENTION

The invention is a RAM coating and a process for making the coating. In detail, the coating includes a binder material that can be a resin or ceramic material containing a mixture of two groups of spheres made of a magnetic material. The spheres of the first group have a specific average diameter and the spheres of the second group have an average diameter generally 0.73 times the specific average diameter of the spheres of the first group. The first and second groups contain generally equal numbers of spheres and the amount of the binder material is just sufficient to bind the mixture together while maintaining the individual spheres separated from each other. In most applications, the average diameter of the first group of spheres should be about 5 microns.

In detail, the process for the manufacture of a radar absorbing material comprising the steps of:

1. providing a first group of spheres made of a magnetic material;
2. providing a second group of spheres made of a magnetic material containing a number of spheres equal to the number of spheres of the first group with an average diameter of generally 0.73 times the average diameter of the spheres of the first group;
3. mixing the first and second groups of spheres together forming a mixture;
4. mixing an amount of binder material to the mixture sufficient to bind the mixture together while maintaining the individual spheres separated from each other; and
5. solidifying the ceramic or resin binder material.

However, precise particle sizes are unavailable from suppliers; they are more in the form of a Gaussian distribution. Thus, upon receipt of various quantities and sizes of spherical iron particles from suppliers, they are sorted by separators into specific size cuts. Particle size distribution is measured on the sized iron and calculations are made to control the number of large and small particles using a weight basis and the measured particle size distribution. Appropriate amounts of sizes of iron particles are mixed together and measurements are made of their tap density and true density. The measured tap and true densities of the iron particles and the true density of the binder are used to calculate how much matrix binder is required to attain a given theoretical percolation factor. The percolation factor is defined as the volume of all particles when optimally packed divided by the volume of particles and binder after the RAM coating cures and optimal packing occurs when all particles touch and therefore occupy a minimum volume.

Ideally, the procedure to determine the weights of particles that must be mixed to get optimum packing assumes two groups of perfect uni-size particles with the smaller diameter group having a diameter that is 0.73 times the larger diameter group particle size. Mixing an equal number of particles is accomplished by calculating the weights of large and small particles. If one assumes that the material for the small and large particles are the same, and therefore have the same density, the weight ratio is a function of only the cube of the radius, or 2.5707.

This means that 2.5706 pounds of large diameter sorted material must be mixed with one pound of small diameter sorted material to get equal numbers of particles with a size ratio of 1 to 0.73 in the resultant mix. However, iron particles available from suppliers have a distribution that typically varies from less than one micron to over ten microns in size. Even after the iron particles are separated by size, a Gaussian distribution exists for each size. Mixing these Gaussian distribution size separated materials using the 2.5707 weight ratio may not provide optimum or repeatable results. This requires that the small and large particle size distributions be measured so that a "best" fit can be used to determine the optimum weight ratios.

Therefore, after separation, size distributions of the small diameter and large diameter size cuts are made by use of a particle size analyzer. The particle size analyzer output separates the range of particle sizes in the sample into mulitple segments and provides a minimum and maximu diameter and a volume percent per segment. The number of particles in a measured segment is calculated using an average particle radius and equating it to the segment radius. Calculations are made by assuming a unit volume of one cc and dividing it into fractions equal to the measured volume fractions. The number of particles in a given fraction is then calculated by dividing the fractional cc volume by the volume of one particle calculated by using the average measured diameter within the volume fraction.

This process is repeated for all the fractions of each particle size, which are thereafter plotted. A visual technique is used to compare plots of the number of particles in the smaller diameter size cut to the number of particles in the larger diameter size cut. Before visual comparisons are performed the distribution of the number of particles in the size cuts must be normalized. The normalization is accomplished by multiplying the large particle sizes by 0.73 and displacing the original large diameter sort particle number distribution to lower diameters. The normalized particle number distribution curve of the larger diameter sort is visually compared to the non-normalized particle distribution curve of the smaller diameter sort. The normalized distribuition curve is multiplied by multiplicaton factors until a best "visual fit" between the two curves is obtained. Once the best fit is obtained, that multiplication factor is used to determine mixture ratio on a pound basis for mixing the large particles to the small particles in a similar manner the smaller diameter particle number distribution can be normalized by dividing its diameters by 0.73 and comparing the resultant curve to the non normalized particle number distribution curve of the larger diameter sort.

Thereafter the binder, in the form of a resin (thermosetting or thermoplastic) or ceramic material, is added in the proper amount to the mixture of particles and solidified by curing or the like. In this step, the mixture of binder and particles maybe cast in a mold or formed into sheets. It may even be sprayed on to a surface as a coating.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

FIG. 3 is a side view of a closely packed group of spherical magnetic material.

FIG. 4 is a diagram indicating the central space between the closely packed group of spherical magnetic material in which a smaller sphere can be positioned.

DESCRIPTION OF THE PREFERRED EMBODIMENT

Figures 1, 5:
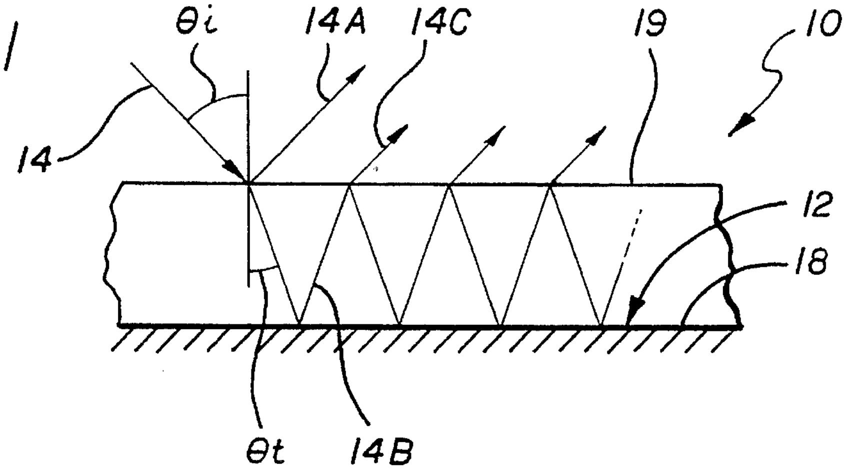
FIG. 1 is a cross-sectional view of a RAM coating applied over a metal substrate.
FIG. 5 is a table of the distribution of two groups of spherical magnetic material sorted by diameters.

In FIG. 1, a typical RAM coating, indicated by numeral 10, is illustrated covering a substrate 12. When a radar wave, indicated by numeral 14, impinges the top surface 16 of the RAM coating 10 at an angle $\theta_i$, it splits into two components. One component reflects off the top surface 14 as a primary reflection coefficient 14A. The other component 14B is refracted at an angle et and travels into the coating 10 until it hits the interface 18 between the ram coating 10 and substrate 12 and is reflected back to the top surface 16 and out thereof as a secondary reflection component 14C. Ram coatings used for specular reflection absorbers must balance the primary and secondary component magnitudes and achieve the proper phase shift between the two components to accomplish good radar attenuation. Traveling wave absorbers must minimize the front face reflection coefficient and absorb most of the radar energy internally before it reaches an impedance mismatch and gets reflected back.

The effective reflection coefficient defines the attenuation of a RAM coating on top of a conductive substrate. The cosine of the refraction (transmission) angle $\theta_t$ is calculated from the equation:

$$\cos\theta_t = \sqrt{1 - \frac{\sin^2\theta_i}{\epsilon * \mu}}$$

where ξ is the permittivity

μ is the permeability $\theta_i$ is the incidence angle (refraction angle)

the primary reflection coefficient Γ for parallel polarization is calculated from the equation:

$$\Gamma = \frac{\sqrt{\frac{\mu}{\epsilon}} * \cos\theta_t - \cos\theta_i}{\sqrt{\frac{\mu}{\epsilon}} * \cos\theta_t + \cos\theta_i}$$

The electrical attenuation coating thickness $t_\theta$ is calculated from the equation:

$$t_e = t * \sqrt{\mu * \epsilon} * \cos\theta_t$$

where t=the physical thickness of the RAM coating and the effective reflection coefficient $\Gamma_{eff.}$ is calculated from the equation:

$$\Gamma\text{eff} \cong \frac{\Gamma - e^{-2i*k*f*t_e}}{1 - \Gamma * e^{-2i*k*f*t_e}}$$

where k=a constant dependent on units.

f=frequency

A Ram coating must be light in weight and have a high attenuation level over a broad frequency range. The technique for obtaining high attenuation is to have the primary reflection coefficient be equal in magnitude to the secondary reflection coefficient and have both coefficients be 180 degrees out of phase. The band width of maximum attenuation is increased by having about one third of the energy reflected as the primary reflection coefficient, two thirds of the energy absorbed in the coating as a result of phase cancellation between the primary and secondary reflections. The loss within the RAM coating is determined by the exponential term in the effective reflection coefficient equation. The energy reflected from the RAM coating surface is determined from the primary and secondary reflections. The effective reflection coefficient calculates all of the quantities in one equation and solves for the attenuation. As can be seen in the equations, the primary reflection coefficient F for vertical polarized electromagnetic waves is controlled by the quantity μ/ξ and is generally lowest on low observable aircraft when $$\sqrt{\frac{\epsilon}{\mu}} * \cos\phi$$

approaches 1.

Figure 2A:
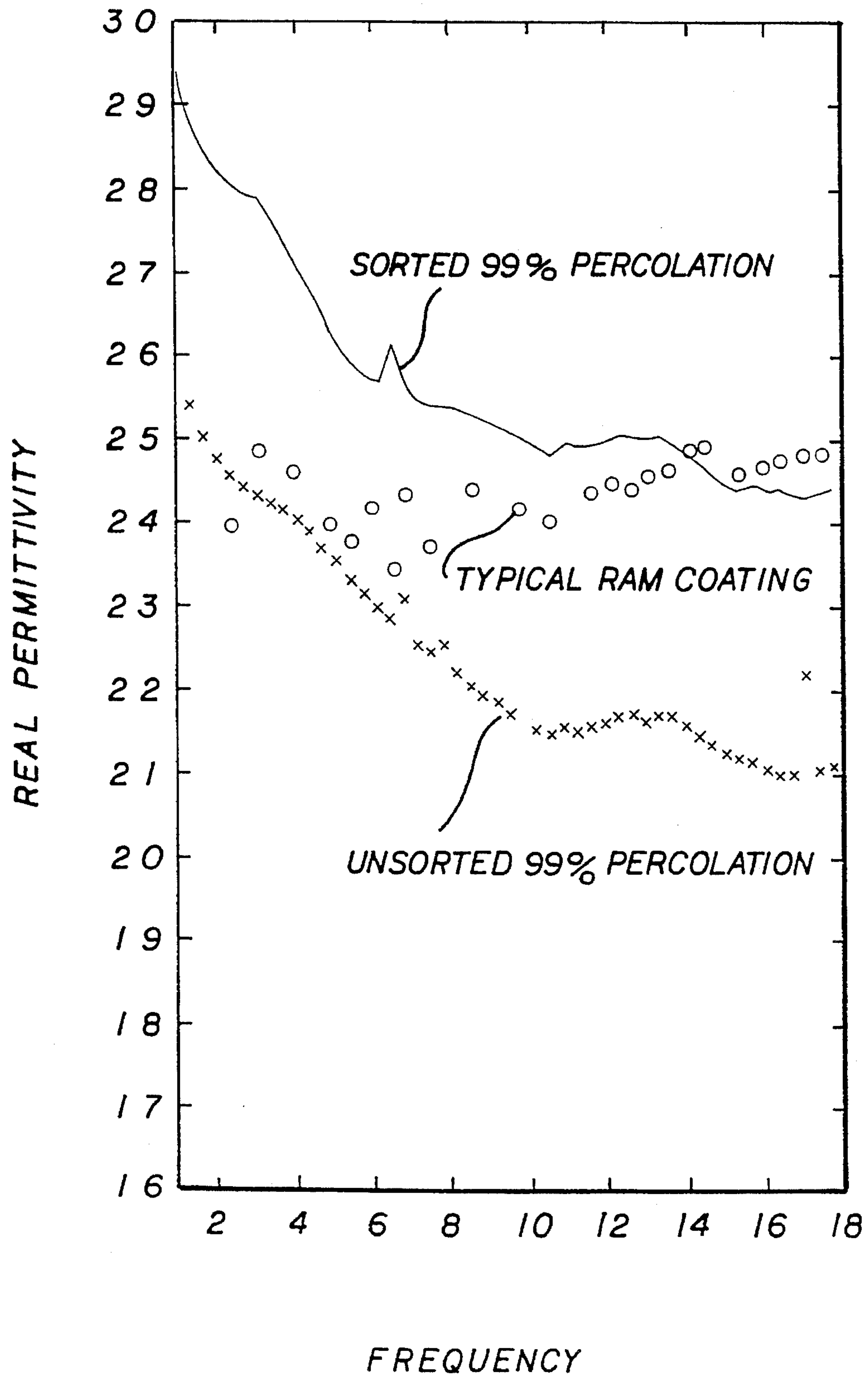
FIG. 2A is a graph of the real permittivity vs. frequency for a typical state of the art Ram coating material, a unsorted 99 percent percolation Ram coating and a sorted 99 percent percolation Ram coating.
Figure 2B:
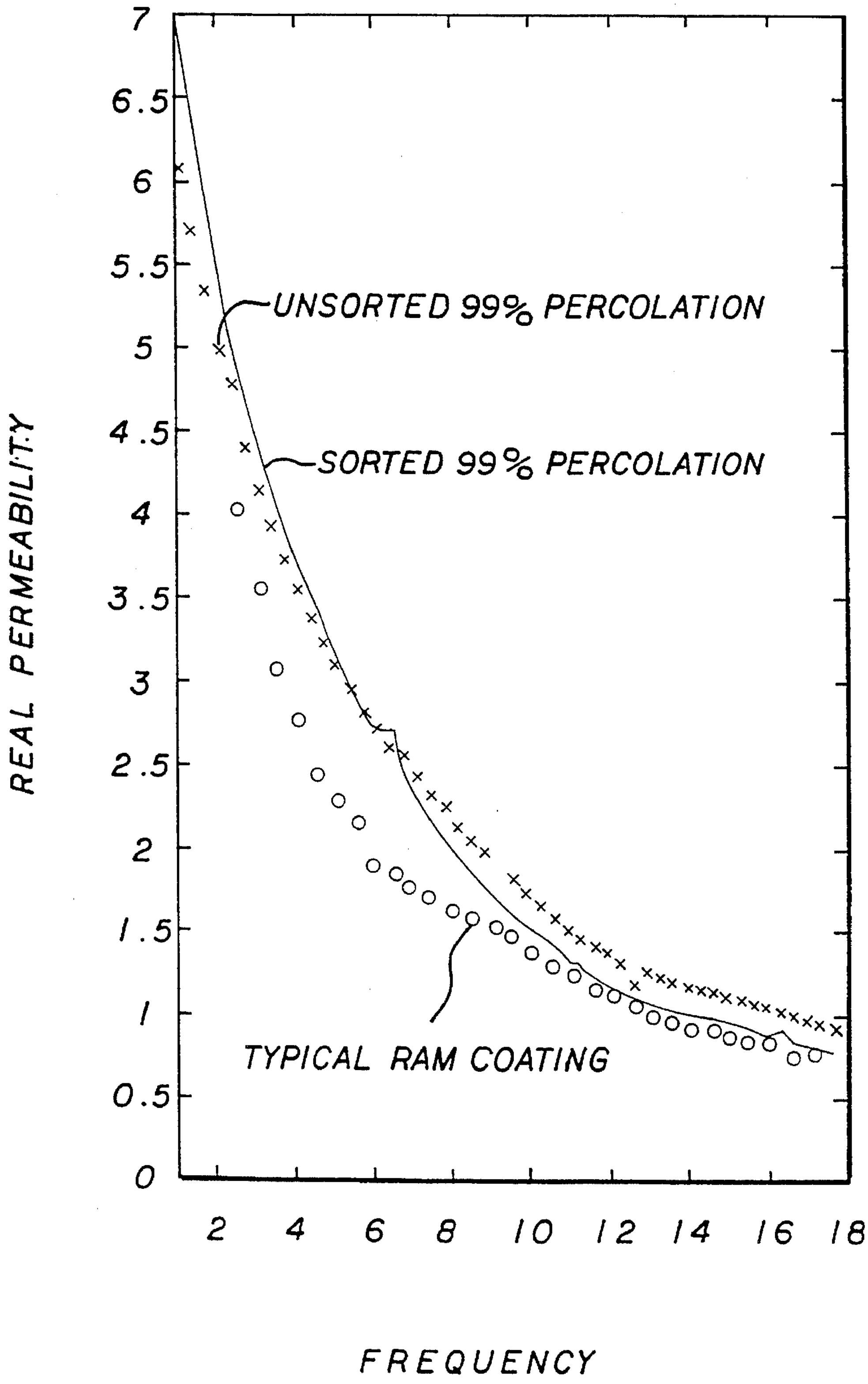
FIG. 2B is a graph of the real permeability vs. frequency for a typical state of the art Ram coating material, a unsorted 99 percent percolation Ram coating and a sort 99 percent percolation Ram coating.

RAM coatings have real ξ values of 20 or more to keep them thin and light weight while providing adequate attenuation. As can be seen in FIG. 2A, the real permeability of a typical RAM coating decreases rapidly from 1 through 6 GHz then decreases at a constant rate from 6 through 18 GHz. As can be seen in FIG. 2B, the real permittivity of a typical RAM coating either remains constant through the 2 to 18 GHz range or has a slight linear decrease from 2 through 18 GHz. This causes the front face reflection coefficient to change rapidly because of the disproportional change in ξ and μ as the frequency goes from 18 GHz to 2 GHz; the phase angle changes because the permittivity/permeability product decreases at a slower rate than the wave length decreases; and the peak attenuation band width decrease with decreasing frequency.

As further seen in FIGS. 2A and 2B, increased loading of magnetic fillers in a typical RAM coating without regard to size sorting results in a disproportionately large increase in the real permittivity compared to the real permeability. This causes a decrease in μ/ξ which increases the primary reflection coefficient and decreases effective attenuation. It also results in both high real and high imaginary permittivity which indicates that particles are shorting and that conductivity is increasing. Increased conductivity causes the effective skin depth of the coating to decrease which in turn reduces energy penetration into.the RAM coating and makes it look more like a reflecting metal surface. It is believed that the increased conductivity is caused by small metal particles creating electrical contact between larger closely packed particles. Proper sorting and sizing of magnetic particles enables close packing to improve real permittivity and permeability without causing the undesirable shorting and high conductivity.

Proper sizing is achieved by using two different size particles. Referring to FIGS. 3 and 4, it can be seen that if eight spheres 30A–H with a diameter $D_L$ are closely packed together so that they are in contact, they will occupy a square box 28, having sides with a length of 2 $D_L$. The distances between the centers of the spheres 30A–H will, of course, be $D_L$ (forming a square box 34), except for those along the diagonal Z. which will have a length L equal to $D_L$ plus $D_S$ Solving for $D_S$ is provided by the simple equation:

$$D_S = Y - D_L = \sqrt{[(D_L)^2 + (D_L)^2 + (D_L)^2]} - D_L$$

$$D_S = \sqrt{3}\, D_L - D_L = 1.732D_L - D_L = 0.732D_L$$

Thus in a two sphere system, the smaller sphere is 0.73 times the diameter of larger sphere. Of course, smaller and smaller particles can be added, but this results, as will be subsequently discussed, in poorer performance. It is also readily apparent that, in the above example, if $N_L$ equals the number of large spheres, the number of small spheres $N_S$ is equal to:

$$N_S = \left(\sqrt[3]{N_L} - 1\right)^3$$

However, when $N_L$ is very large, as in the case of any RAM coating applied to a vehicle, $N_S \cong N_L$. For example, if $N_L$ equals 1,000,000 spheres there is only a 2.3 percent error, at 10,000,000 the error is less than 0.2 percent.

As additionally shown in FIGS. 2A and 2B, the proper percolation factor produces a RAM coating with the following advantages:

1. The real permittivity decreases with an overall shape similar to the change in the real permeability.
2. The real permeability increases at lower frequencies and decreases less with increasing frequency than non sorted material.
3. The real permittivity, real permeability, and imaginary permeability increase faster than the imaginary permittivity.
4. The overall electrical properties of the sorted particles are better than the non-sorted particles as the percolation factor increases.

Measurements indicate that permeability's of size sorted RAM coatings can be increased to higher values than non-size sorted RAM coatings and that the increase occurs at magnetic particle volume loadings which do not cause poor coating physical properties. This is the result of removing small diameter particles with their disproportionately high surface areas for a unit particle volume. Examining the changes in permeability and permittivity with frequency and the equations which calculate attenuation, the $\xi$ and $\mu$ terms of the low percolation factor sorted coatings change their relation to each other as the frequency changes. The permeability changing much more rapidly at lower frequencies than the permittivity. This causes the $\mu/\xi$ term in the primary reflection coefficient to change with frequency. This change upsets the relation between the primary and secondary reflection coefficients in the RAM coating resulting in limited band width at peak attenuation. The $\xi$ and $\mu$ values of the high percolation sorted coatings change in a proportional way with frequency and keep the primary reflection coefficient relatively constant with frequency change. Additionally the loss (exponential) term in the effective reflection coefficient equation is affected by the electrical thickness of the coating.

In addition, the loss and phase change are related to the wavelength of the wave which is the speed of light in vacuum divided by the frequency. This is reflected by the use of the f (frequency) term in the effective reflection coefficient exponential. The relative change in the values of the $\xi$ and $\mu$ terms of the low percolation factor Ram coatings indicate that the internal loss will decrease more rapidly as the frequency decreases than in high percolation factor RAM coatings.

Electrical measurements also indicate that higher permeability's with equal magnetic particle volume loading are possible. Generally permeability's of mixtures of materials are a function of the effective particle permeability and the volume of particles loaded into the mixture. The effective particle permeability is a function of the geometry of the particle with a value of approximately 3.0 for a sphere of ferromagnetic material to much higher permeability's for fibers. The measurement of high mixture permeability with spherical particle loading using size sorted particles and the increase in real permittivity without a proportionate increase in the imaginary permittivity indicates that some unique phenomenon is occurring when sorted particles are used. This phenomenon appears to be related to making the spherical particles look like non spherical particles caused by electrical contact of a controlled number of the magnetic spheres which have a higher effective permittivity than electrically isolated spheres. This controlled electrical contact is another unique phenomenon of using size sorted magnetic spheres to improve RAM coating performance as a function of weight.

The bulk of the formulations evaluated to date were fabricated using size sorted iron spheres dispersed in melted paraffin wax. Paraffin was used because it is easy to handle. Of course, actual ram material would use resins or ceramics and the like. Upon receipt of various quantities and sizes of spherical iron particles from suppliers they are sorted by centrifugal type separators into specific size cuts. Particle size distribution is measured on the sized iron and calculations are made to control the number of large and small particles using a weight basis and the measured particle size distribution. Appropriate amounts of sizes of iron particles are mixed together and measurements are made of their tap density and true density. The measured tap and true densities of the iron particles and the true density of the binder are used to calculate how much matrix binder is required to attain a given theoretical percolation factor. Percolation factor is defined as the volume of all particles when optimally packed divided by the volume of particles and binder after the RAM coating cures and optimal packing occurs when all particles touch and therefore occupy a minimum volume.

An example of the calculations used to determine the formulation for a 99 percolation factor material is as follows:

Measured true density of iron is 7.60 g/cc

Measured tap density is 4.402 g/cc

Volume fraction of iron for optimum packing is

Tap Density/True Density (4.402 g/cc)/(7.60 g/cc)=0.5792

Volume fraction of binder at optimal packing is $$1-0.5792=0.4208$$

For 99 percolation factor need to add additional binder $$1/0.99=1.0101$$

Calculate volumes required:

| | | |
|---|---|---|
| Iron | 0.5792 cc = | 0.5792 cc |
| Binder | 0.420 cc + .0101 cc = | 0.4309 cc |
| | Total | 1.0101 cc |

Volume fraction of iron=0.5792 cc/1.0101 cc=0.57341

Volume fraction of binder=0.4309 cc/1.0101 cc=0.42659

Calculate weight basis for mixture:

| | | |
|---|---|---|
| Iron | 0.57341 cc (7.610 g/cc) = | 4.637 g |
| Binder | 0.42659 cc (0.915 g/cc) = | 0.3903 g |
| | Total = | 4.7540 g |

Weight fraction of iron=4.3637 g/4.754 g=0.9179

Weight fraction of binder=0.3903 g/4.754 g=0.0821

Ideally, the procedure to determine the weights of particles that must be mixed to get optimum packing assumes two groups of perfect uni-size particles with the smaller diameter group having a diameter which is 0.73 times the larger diameter group particle size. Mixing an equal number of particles is accomplished by calculating the weights of large and small particles as follows:

Assuming their densities are the same, the volume ratios will be the same as the weight ratios. If the volume densities are not the same then the volume ratios must be multiplied by the ratio of the densities.

The weight ratios ($W_L/W_S$) is as follows:

$$\frac{W_L}{W_S} = \frac{V_L\rho}{V_S\rho} = \frac{4/3*\pi*R_L^3*\rho}{4/3*\pi*R_S^3*\rho} = \frac{R_L^3}{R_S^3} = \frac{1^3}{0.732^3} = 2.5706$$

where $V_L$ and $V_S$ are the volumes of the large and small spheres $R_L$ and $R_S$ are the radius of the large and small spheres $\rho$ the density This means that 2.5706 pounds of large diameter sorted material must be mixed with one pound of small diameter sorted material to get equal numbers of particles with a size ratio of 1 to 0.73 in the resultant mix. However, iron particles available from suppliers have a distribution that typically varies from less than one micron to over ten microns in size. Even after the iron particles are separated by size using a centrifuge, a Gaussian distribution exists. Mixing these Gaussian distribution size separated materials using the 2.5707 weight ratio may not provide optimum or repeatable results This requires that the small and large particle size distributions be measured so that a "best" fit can be used to determine the optimum weight ratios. A procedure used to accomplish this follows:

FIG. 5 presents typical size distributions of the small diameter and large diameter size cuts made with a Coulter LS particle size analyzer after centrifugal separation. The dissimilarities in the shape of the two distributions is typical of actual sorts. The number of particles in a measured segment (N) is calculated using an average particle radius and equating it to the segment radius.

$$N = \frac{V_F}{4/3*\pi*\bar{R}^3}$$

where: $V_F$ is the Volume fraction $\bar{R}$ is the average radius in each volume segment.

(beginning radius—end radius of segment)/2)

Calculations are made by assuming a unit volume of one cc and dividing it into fractions equal to the measured volume fractions. The number of particles in a given fraction is then calculated by dividing the fractional cc volume by the volume of one particle calculated by using the average measured diameter within the volume fraction. The data for the first segment of the larger diameter sort size is interpreted as 0.030 volume percent is between 1.047 and 1.149 microns in diameter.

$$\text{Average diameter} = \frac{1.047\mu + 1.149\mu}{2} = 1.098\mu$$

$$R = \frac{1.098\mu}{2} = 0.549\mu$$

$$N = \frac{0.030}{\frac{4}{3}*\pi*r^3} = \frac{0.030}{\frac{4}{3}*\pi*(0.549\times10^{-6})^3} = 4.32828\times10^{16}$$

Figure 6:
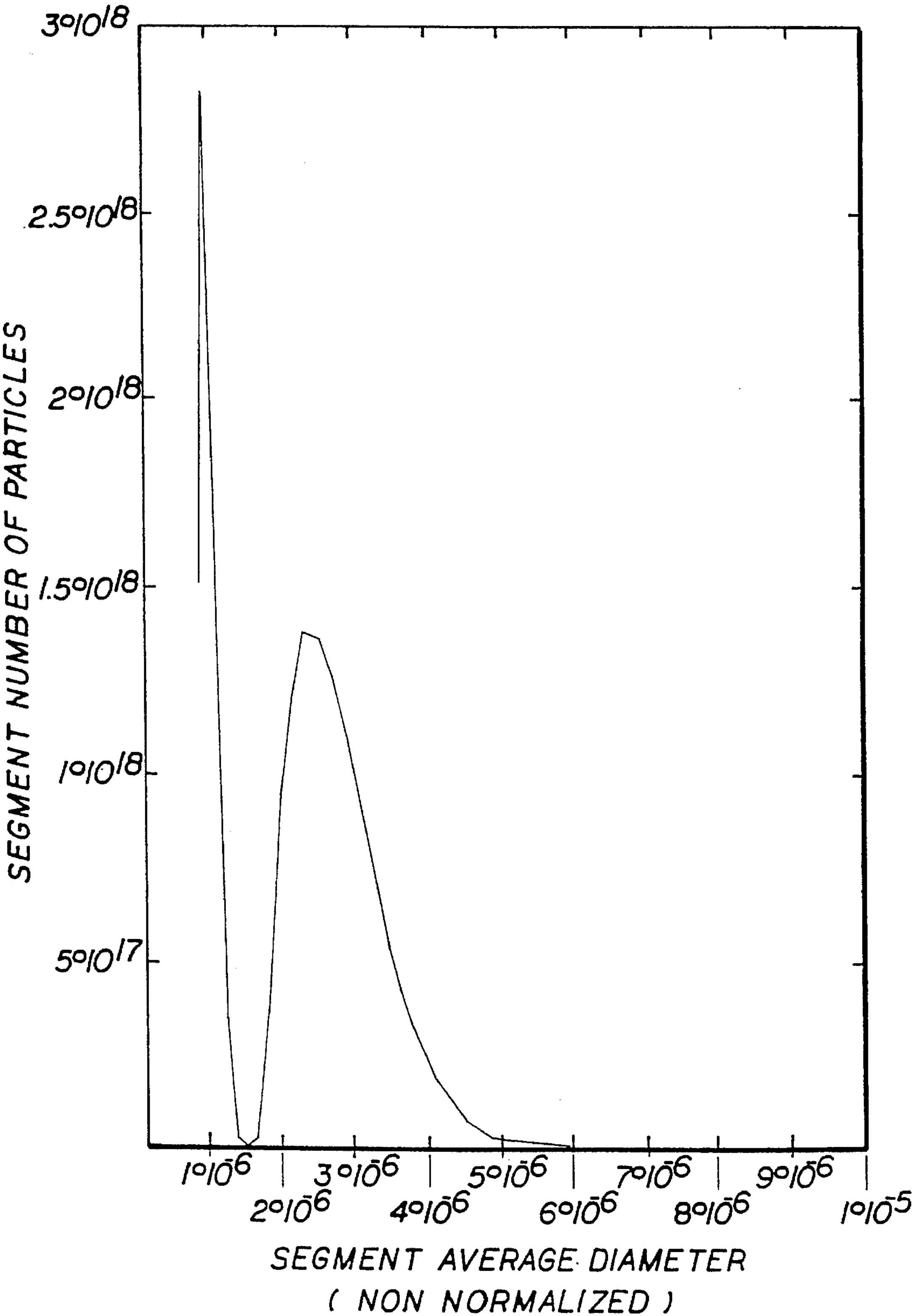
FIG. 6 is graph of the distribution by diameter of larger diameter spherical magnetic particles from the table in FIG. 5 wherein the number of particles is plotted against the diameter.
Figure 7:
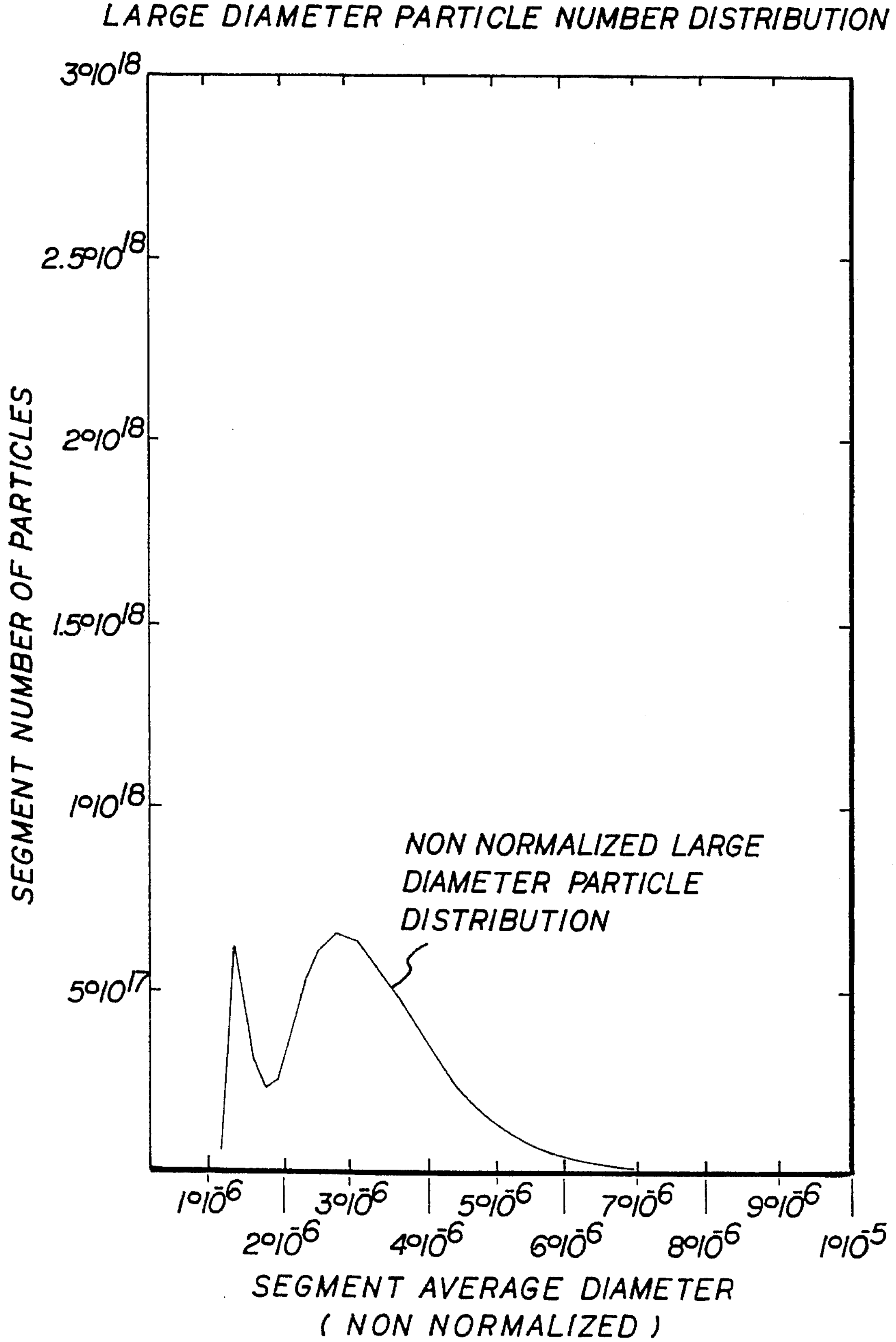
FIG. 7 is a graph of the distribution, by diameter, of smaller diameter spherical magnetic particles from the table in FIG. 5, wherein the number of particles is plotted against the diameter.
Figure 8:
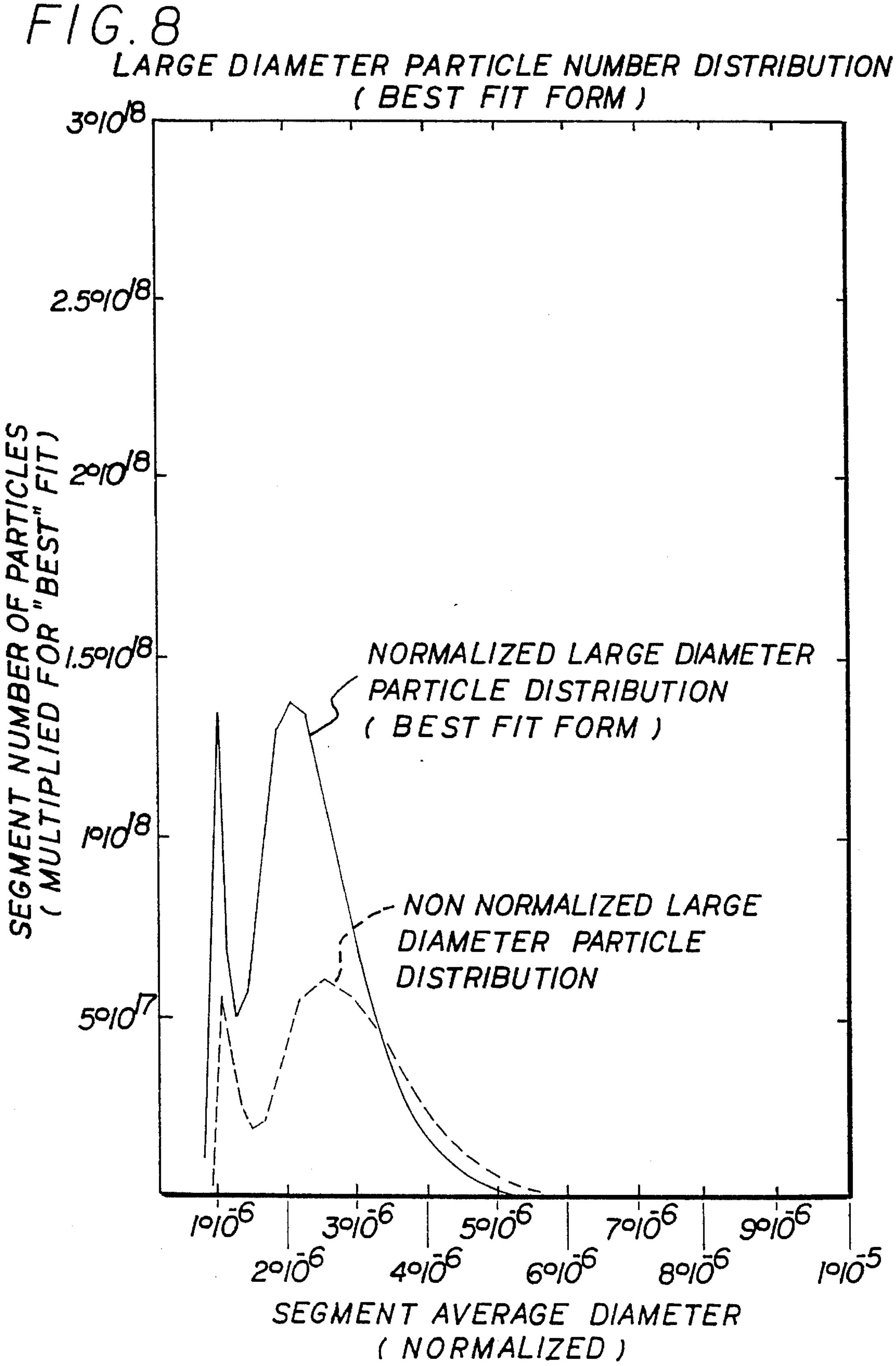
FIG. 8 is a graph of the distribution, by diameter, of larger diameter spherical magnetic particles shown in FIG. 6, normalized and multiplied by a multipliation factor so that it can be over-layed on the graph of smaller spherical magnetic particles shown in FIG. 7, in order to determine the best fit.

This process is repeated for all the fractions of each particle size and then plotted as shown in FIGS. 6 and 7. A visual technique is used to compare plots of the number of particles in the smaller diameter size cut to the number of particles in the larger diameter size cut. Before visual comparisons are performed the distribution of the number of particles in the size cuts must be normalized. The normalization is accomplished by multiplying the large particle sizes by 0.73 and displacing the original large diameter sort particle number distribution to lower diameters as shown in FIG. 8. The normalized particle number distribution curve of the larger diameter sort is visually compared to the non normalized particle distribution curve of the smaller diameter sort. In a similar manner the smaller diameter particle number distribution can be normalized by dividing its diameters by 0.73 and comparing the resultant curve to the non normalized particle number distribution curve of the larger diameter sort.

Figure 9:
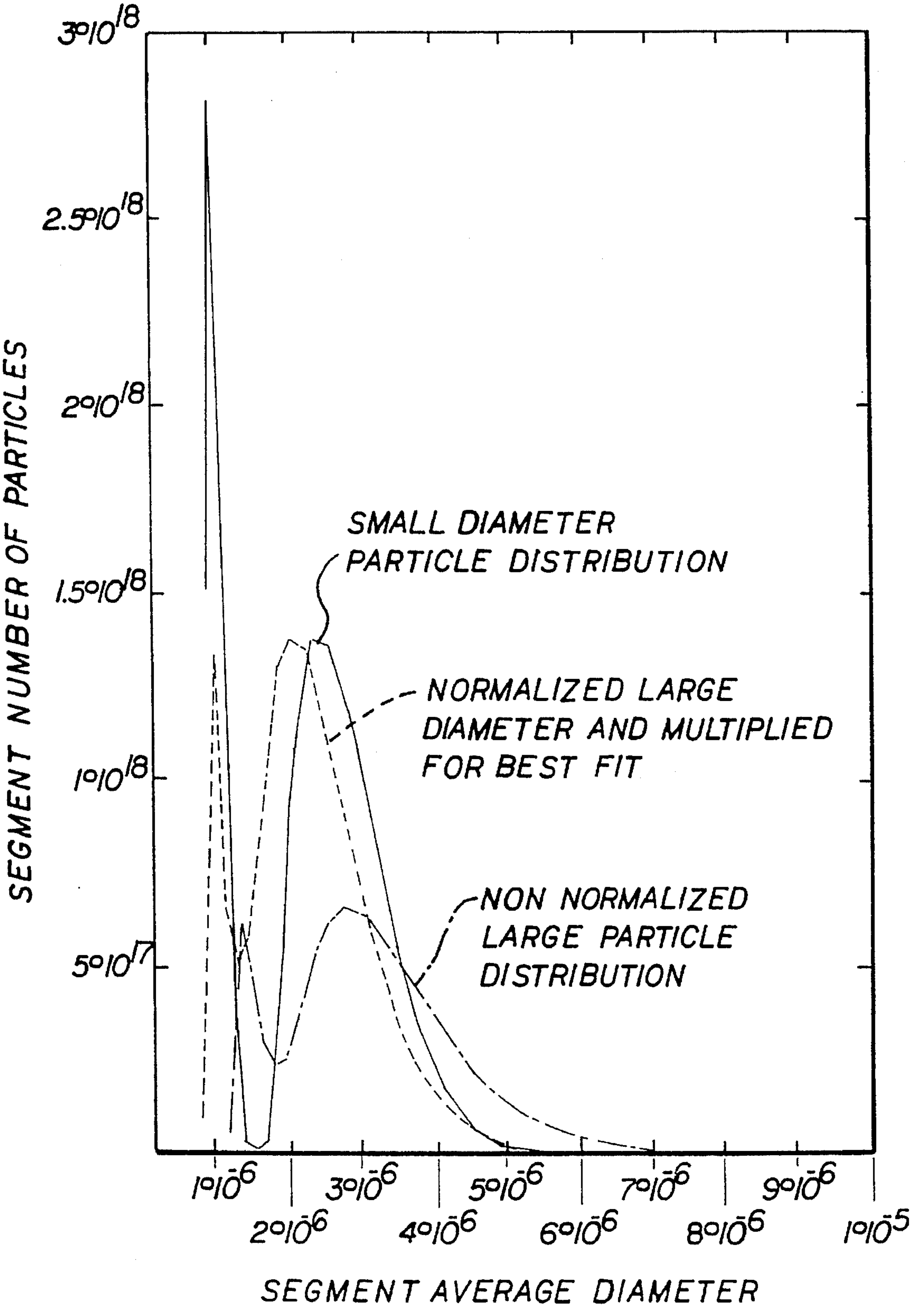
FIG. 9 is a combination of FIGS. 6, 7, 8 and, additionally, a graph of the particle distribution shown in FIG. 8 adjusted such that the total number of particles in the distribution general equals the number of particles in the distribution shown in FIG. 7.
Figure 10:
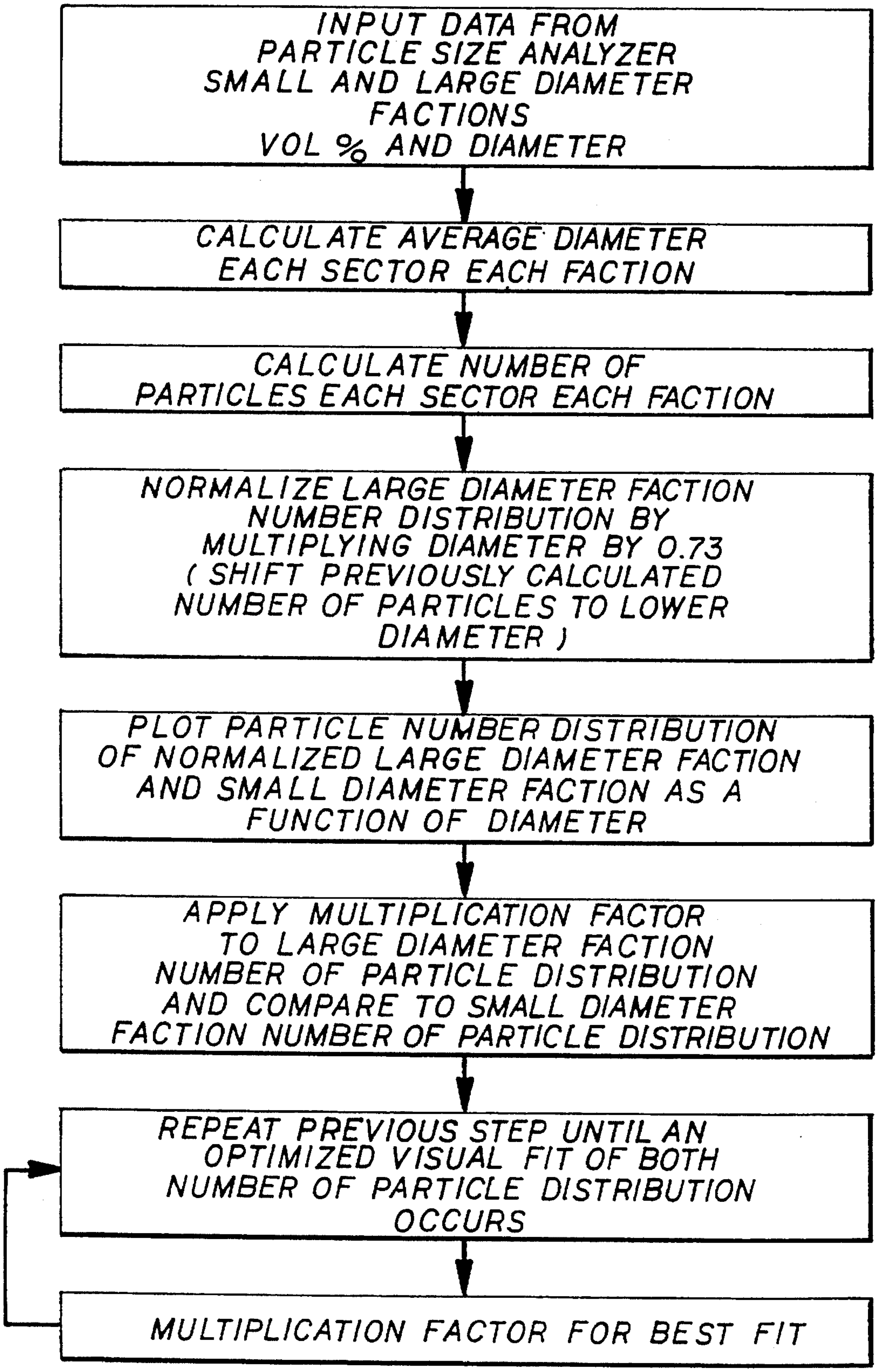
FIG. 10 is a flow chart for a computer program to automate the process of optimizing the small and large particle distributions

Thus in the above example the sort shown in FIG. 6 is normalized by multiplying by 0.73 and multiplied by a multiplication factor providing the distribution curve shown in FIG. 8. Typically, the normalized distribution curve must be repeatably multiplied by a series of multiplication factors until the "best fit" shown occurs. The distribution curve shown in FIG. 8 is then overlaid on the distribution curve for the smaller diameter particles shown in FIG. 7 to provide a visual fit. This "best" visual fit is shown in FIG. 9 and results in a mixture of 2.125 pounds of the larger diameter sort particles for each pound of smaller diameter sort particles. This procedure can be computerized and a sample flow chart for a suitable computer program is illustrated in FIG. 10.

Thereafter the binder, in the form of a resin or ceramic, is added in the proper amount to the mixture of particles and solidified by curing. In this step, the mixture of binder and particles maybe cast in a mold, formed into sheets. It may even be sprayed on to a surface as a coating. The imparting of a higher frequency dependent real permittivity with controlled imaginary permittivity and a high real and imaginary permeability using particle size sorting offers the following improvements compared to non particle size sorted RAM coatings.

1. Lighter and thinner specular coatings having broad band high level attenuation.
2. Thinner traveling wave absorbers requiring less thickness length because of higher imaginary permeability and less back scatter because of a significantly lower front face reflection coefficient.
3. A reduction in weight by the addition of light weight spheres without causing any detrimental change in the electrical properties of existing RAM coatings.
4. Combined specular and traveling wave RAM coatings that provide superior overall radar signature reductions
5. The elimination of small particles under two microns in size provides a RAM coating with better physical properties by significantly reducing the surface area required to be wetted by the polymer binder.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

INDUSTRIAL APPLICABILITY

The invention has applicability to military vehicles and structures that require reduced radar cross-sections. Thus, for example, the invention would have application to the military aircraft and ship industries.

We claim:

1. A radar absorbing material comprising a binder material containing a mixture of two groups of spheres made of a magnetic material, said first group having a specific average diameter and said second group having an average diameter generally 0.73 times the specific average diameter of said spheres of said first group, said first and second groups containing generally equal numbers of spheres and the amount of said binder material just sufficient to both bind said mixture together while maintaining said individual spheres separated from each other.

2. The material as set forth in claim 1 were in said magnetic material is made of iron.

3. The material as set forth in claim 2 wherein said average diameter of said first group of spheres is 5 microns.

4. The material as set forth in claim 1, or 2, or 3 wherein the binder materical is a resin.

5. The material as set forht in claim 1, or 2, or 3 wherein the binder material is a ceramic.

6. A process for the manufacture of a radar absorbing material comprising the steps of:

providing a first group of spheres made of a magnetic material, said spheres having and average diameter;

providing a second group of spheres made of a magnetic material containing a number of spheres equal to the number of spheres of said first group with an average diameter of generally 0.73 times the average diameter of said spheres of said first group;

mixing said first and second groups of spheres together forming a mixture;

mixing an amount of binder matrix material to said mixture sufficient to both bind said mixture together while maintaining the individual spheres separated from each other; and curing said resin matrix material.

7. The process as set forth in claim 6 wherein said first and second group of spheres have diameters in a generally Gaussian distributions about said average diameters, said step of providing a second group of spheres made of a magnetic material containing a number of spheres equal to the number of spheres of said first group with an average diameter of generally 0.73 times the average diameter of said spheres of said first group comprises the steps of:

determining the number of particles in equal volume samples of each of said groups; and plotting the particle diameter distribution of each of said volume samples;

normalizing the plot of one of said sample plots of particle distributions;

overlaying said normalized plot on the non-normalized plot; and applying a multiplication factor to the values of the smaller of said normalized and non-normalized plots until a best fit between the two is achieved.

8. The process as set forth in claim 7 where in said step of mixing said first and second groups of spheres together forming a mixture includes the step of mixing said first and second groups of spheres in a weight ratio equal to the multiplication factor providing the best fit between said normalized plot and said non-normalized plot.

9. The process as set forh in claim 6, or 7, or 8 wherein in said binder material is a resin and the step of solidifying includes the step of curing said resin.

10. The process as set forth in claim 6, or 7, or 8 wherein said binder is a ceramic and the step of solidifying the binder includes the step of curing the ceramic.

* * * * *